United States Patent
Lieu et al.

(10) Patent No.: US 9,361,919 B1
(45) Date of Patent: Jun. 7, 2016

(54) DISK DRIVE WITH PARALLEL HEAD ACTUATION

(71) Applicant: Seagate Technology LLC, Cupertino, CA (US)

(72) Inventors: Binh Kim Lieu, Minneapolis, MN (US); Evgeny Kharisov, Chaska, MN (US); Kenneth Haapala, Plymouth, MN (US); Raye A. Sosseh, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/874,866

(22) Filed: Oct. 5, 2015

Related U.S. Application Data (63) Continuation-in-part of application No. 14/511,779, filed on Oct. 10, 2014, now abandoned.

(51) Int. Cl.
G11B 21/02 (2006.01)
G11B 5/55 (2006.01)
G11B 5/596 (2006.01)

(52) U.S. Cl.
CPC .............. *G11B 5/5578* (2013.01); *G11B 5/556* (2013.01); *G11B 5/5547* (2013.01); *G11B 5/59627* (2013.01)

(58) Field of Classification Search
None
See application file for complete search history.

(56) References Cited

U.S. PATENT DOCUMENTS

| 4,270,154 A | 5/1981 | Crawford |
| 4,423,448 A | 12/1983 | Frandsen |
| 4,544,972 A | 10/1985 | Kogure et al. |
| 4,851,939 A | 7/1989 | Seo |
| 5,050,169 A | 9/1991 | Monett |
| 5,218,496 A | 6/1993 | Kaczeus et al. |
| 5,223,993 A | 6/1993 | Squires et al. |
| 5,293,282 A | 3/1994 | Squires et al. |
| 5,297,024 A | 3/1994 | Carobolante |
| 5,341,351 A | 8/1994 | Ng et al. |
| 5,343,345 A | 8/1994 | Gilovich |
| 5,343,347 A | 8/1994 | Gilovich |
| 5,355,486 A | 10/1994 | Cornaby |
| 5,471,733 A | 12/1995 | Bernett |
| 5,477,401 A | 12/1995 | Squires et al. |
| 5,523,901 A | 6/1996 | Anderson |
| 5,761,007 A | 6/1998 | Price |

(Continued)

FOREIGN PATENT DOCUMENTS

| EP | 0977181 | 2/2000 |
| GB | 757684 | 9/1956 |

(Continued)

OTHER PUBLICATIONS

U.S. Appl. No. 14/511,779, filed Oct. 10, 2014, Lieu et al.

*Primary Examiner* — K. Wong
(74) *Attorney, Agent, or Firm* — Hollingsworth Davis, LLC (57) ABSTRACT

An apparatus includes a first read/write head coupled to a first micro actuator, a second read/write head coupled to a second micro actuator, an actuator and a controller. The actuator is coupled to both the first and second micro actuators. The controller is configured to position the first read/write head in response to a first micro actuator control signal and an actuator control signal. Further, the controller is configured to position the second read/write head in response to a second micro actuator control signal and the actuator control signal. The positioning of the first and second read/write heads by the controller is performed substantially simultaneously.

27 Claims, 8 Drawing Sheets

(56) References Cited

U.S. PATENT DOCUMENTS

| | | |
|---|---|---|
| 5,774,291 A | 6/1998 | Contreras et al. |
| 5,805,386 A | 9/1998 | Faris |
| 5,901,010 A | 5/1999 | Glover et al. |
| 5,983,485 A | 11/1999 | Misso |
| 5,991,124 A | 11/1999 | Forbord |
| 6,005,743 A | 12/1999 | Price |
| 6,057,990 A | 5/2000 | Gilovich |
| 6,081,399 A | 6/2000 | Lee |
| 6,121,742 A | 9/2000 | Misso |
| 6,160,676 A | 12/2000 | Takaishi |
| 6,344,938 B1 | 2/2002 | Smith |
| 6,384,998 B1 | 5/2002 | Price |
| 6,437,937 B1 | 8/2002 | Guo et al. |
| 6,449,130 B1 | 9/2002 | Koyama |
| 6,490,138 B1 | 12/2002 | Prater |
| 6,493,172 B1 | 12/2002 | Morris et al. |
| 6,519,109 B1 | 2/2003 | Price |
| 6,542,326 B1 | 4/2003 | Ell et al. |
| 6,560,075 B2 | 5/2003 | Price |
| 6,563,657 B1 | 5/2003 | Serrano |
| 6,603,640 B1 | 8/2003 | Prater |
| 6,678,120 B2 | 1/2004 | Money |
| 6,690,549 B1 | 2/2004 | Aikawa |
| 6,693,760 B1 | 2/2004 | Krounbi et al. |
| 6,735,032 B2 | 5/2004 | Dunn |
| 6,819,513 B2 | 11/2004 | Chainer |
| 6,847,504 B1 | 1/2005 | Bennett |
| 6,885,513 B1 | 4/2005 | Baker |
| 6,914,746 B1 | 7/2005 | Meyer |
| 6,952,322 B1 | 10/2005 | Codilian et al. |
| 7,012,777 B1 | 3/2006 | Hirano et al. |
| 7,031,115 B1 | 4/2006 | Gilovich |
| 7,102,842 B1 | 9/2006 | Howard |
| 7,133,233 B1 | 11/2006 | Ray et al. |
| 7,146,623 B2 | 12/2006 | Kuwajima |
| 7,199,981 B2 | 4/2007 | Zabtcioglu |
| 7,315,429 B2 | 1/2008 | van Zyl |
| 7,385,781 B1 | 6/2008 | Craig |
| 7,469,463 B2 | 12/2008 | Prater |
| 7,492,542 B2 | 2/2009 | van Zyl |
| 7,710,683 B2 | 5/2010 | Craig |
| 7,760,463 B2 | 7/2010 | Ward |
| 8,028,311 B2 | 9/2011 | Gilovich |
| 8,693,126 B2 | 4/2014 | Buckholdt |
| 9,142,246 B1 | 9/2015 | Trantham et al. |
| 2002/0039259 A1 | 4/2002 | Koyama et al. |
| 2012/0250177 A1 | 10/2012 | Somanache et al. |

FOREIGN PATENT DOCUMENTS

| | | |
|---|---|---|
| JP | 52145017 | 12/1977 |
| JP | 59218677 | 12/1984 |
| JP | 63306567 | 12/1988 |
| JP | 04011302 | 1/1992 |
| JP | 5257613 | 10/1993 |
| JP | 07169185 | 7/1995 |
| JP | 10172252 | 6/1998 |
| KR | 20040451 | 6/2004 |
| WO | WO 2012064226 | 5/2012 |

DISK DRIVE WITH PARALLEL HEAD ACTUATION

RELATED PATENT DOCUMENTS

This application is a continuation-in-part of patent application Ser. No. 14/511,779 filed on Oct. 10, 2014 which is incorporated herein by reference in its entirety.

SUMMARY

An apparatus of the present disclosure includes a first read/write head coupled to a first micro actuator, a second read/write head coupled to a second micro actuator, an actuator and a controller. The actuator is coupled to both the first and second micro actuators. The controller is configured to position the first read/write head in response to a first micro actuator control signal and an actuator control signal. Further, the controller is configured to position the second read/write head in response to a second micro actuator control signal and the actuator control signal. The positioning of the first and second read/write heads by the controller is performed substantially simultaneously.

Another apparatus of the present disclosure includes a first read/write head configured to be positioned by a first micro actuator and an actuator, a second read/write head configured to be positioned by a second micro actuator, and a controller. The controller is coupled to the first and second micro actuators and the actuator. The controller is configured to position the first read/write head through actuation of the first micro actuator and the actuator in response to a first position error signal. The controller is further configured to position the second read/write head through actuation of only the second micro actuator in response to a second position error signal. The controller is able to position both the first read/write head and the second read/write head substantially simultaneously.

A method of the present disclosure includes controlling a position of a first read/write head in response to an actuator control signal and a first micro actuator control signal and substantially simultaneously controlling a position of a second read/write head in response to the actuator control signal and a second micro actuator control signal.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Systems, devices or methods disclosed herein may include one or more of the features structures, methods, or combination thereof described herein. For example, a device or method may be implemented to include one or more of the features and/or processes below. It is intended that such device or method need not include all of the features and/or processes described herein, but may be implemented to include selected features and/or processes that provide useful structures and/or functionality.

The various embodiments described below may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Hard disk drives (HDDs) are digital data storage devices which may allow host computers to store and retrieve large amounts of data in a fast and efficient manner. A typical disk drive may include a plurality of magnetic recording disks which are mounted to a rotatable hub of a spindle motor and rotated at a high speed. Information may be stored on each disk in concentric tracks. The data tracks are usually divided into sectors. Information may be written to and/or read from a storage surface(s) of a disk by a transducer or head. The transducer may include a read element separate from a write element, or the read and write elements may be integrated into a single read/write element. The transducer may be mounted on an actuator arm capable of moving the transducer radially over the disk. Accordingly, the movement of the actuator arm may allow the transducer to access different data tracks. The disk may be rotated by the spindle motor at a relatively high speed, which may allow the transducer to access different sectors within each track on the disk.

The actuator arm may be coupled to a motor or coarse actuator, such as a voice coil motor, to move the actuator arm such that the transducer moves radially over the disk. Operation of the coarse actuator may be controlled by a servo control system. The servo control system generally performs two distinct functions: seek control and track following. The seek control function includes controllably moving the actuator arm such that the transducer is moved from an initial position to a target track position. In general, the seek function may be initiated when a host computer associated with the computer disk drive issues a seek command to read data from or write data to a target track on the disk.

As the transducer approaches the target track, the servo control system may initiate a settle mode to bring the transducer to rest over the target track within a selected settle threshold, such as a percentage of the track width from track center. Thereafter, the servo control system may enter the track following mode, where the transducer is maintained at a desired position with respect to the target track (e.g., over a centerline of the track) until desired data transfers are complete and another seek is performed.

The speed at which the data transfer occurs has become increasingly important with the encroachment of solid state drives (SSDs) into storage solutions currently served by HDDs. Currently available technologies only allow actuation of a single head which limits the data access rate and servo performance. To address this limitation, the following disclosure illustrates a control architecture and control design methodology for parallel actuation of multiple heads in an HDD system. The new architecture and methodology allow for simultaneous control of multiple HDD heads which enables parallel data streaming and enhances the performance of traditional HDD systems. More specifically, the new architecture and methodology provides for a robust controller that is capable of keeping the tracking capability and performance of dual head actuations substantially comparable to that of single head actuation.

To provide a clearer understanding of the new control architecture and control design methodology disclosed herein, it is beneficial to first understand the components and operation of an HDD 100 if it were to include only a single head, which is described below with reference to FIGS. 1A and 1B.

Figure 1A:
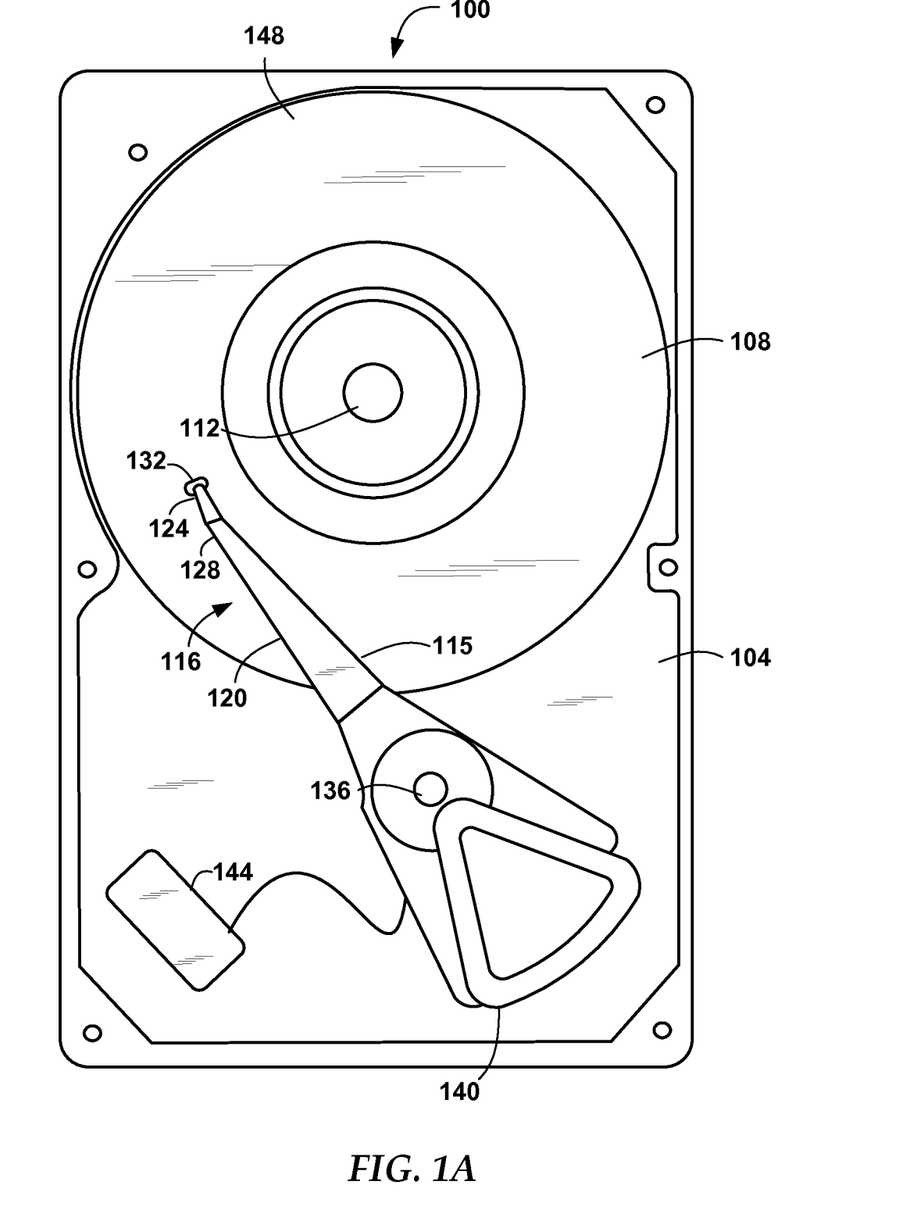
FIG. 1A is a plan view of a hard disk drive (HDD) that can incorporate a control architecture and control design methodology for parallel actuation of multiple heads in accordance with embodiments of the disclosure.

A simplified diagrammatic representation of a hard disk drive is illustrated in FIG. 1A. The disk drive, generally identified by reference number 100, includes a base 104 and one or more data storage disks 108 (only one of which is shown in FIG. 1A). The disk 108 may be a magnetic disk, an optical disk, or any other type of data storage disk, and may have data storage tracks defined on one or both of its storage surfaces. The disk 108 is interconnected to the base 104 by a spindle motor (not shown) mounted within or beneath a hub 112, such that the disk 108 can be rotated relative to the base 104.

A head stack assembly 115, coupled to a controller 144, includes a plurality of actuator arm assemblies 116 each having a first member 120 and a second member 124. The first member 120 is coupled between the base 104 and the second member 124, and the members 120 and 124 can provide two stages of movement. Interconnecting the first member 120 and the second member 124 of the actuator arm assembly 116 is a micro actuator 128. A transducer (or magnetic read/write head) 132 is mounted on a distal portion of the actuator arm assembly 116. In particular, the transducer 132 can be coupled to an end of the second member 124 of the actuator arm assembly 116 so that it can be positioned adjacent to a storage surface of the disk 108. The transducer 132 may, for example, include a magneto resistive (MR) element and/or a thin film inductive (TFI) element.

The head stack assembly 115 can be interconnected to the base 104 by a bearing 136. A coarse actuator 140 can pivot the head stack assembly 115 about the bearing 136 to position the micro actuator 128 and, thereby, position the transducer 132 with respect to the disk 108. In particular, the coarse actuator 140 positions the transducer 132 to allow it to access different data tracks or cylinders 148 on the disk 108. Accordingly, the coarse actuator 140 can position the micro actuator 128 and, thereby, the transducer 132 over a range of movement that may correspond to the distance between an inner and outer data storage track of the storage surface of the disk 108. The coarse actuator 140 may be, for example, a motor, such as a voice coil motor (VCM).

The articulation of the second member 124 with respect to the first member 120 of the actuator arm assembly 116 may be achieved, for example, by providing a journal bearing as part of the micro actuator 128, by providing a flexible interconnection between the second member 124 and the first member 120, or by otherwise joining the second member 124 to the first member 120 in such a way that the second member 124 is allowed to move with respect to the first member 120.

The micro actuator 128 is configured to position the transducer 132 relative to the disk 108 over a range of movement that is less than the range of movement provided by the coarse actuator 140. As such, the micro actuator 128 may affect finer positioning and/or higher frequency movements of the transducer 132 within its range of movement (e.g., over relatively short distances), such as that which may be encountered during short seeks (e.g., a few tracks) or during track following. Accordingly, the micro actuator 128 may move the transducer 132 faster across the disk 108, within its range of movement, than may be possible with the coarse actuator 140. In some embodiments, the second member 124 may be eliminated by directly connecting the transducer 132 to a surface or extension of the micro actuator 128. The micro actuator 128 may be any mechanism capable of moving the transducer 132 relative to the disk 108, such as by adjusting the second member 124 of the actuator arm assembly 116 with respect to the first member 120. For example, the micro actuator 128 may be a piezoelectric actuator, an electromagnetic actuator, or an electrostatic actuator.

Figure 1B:
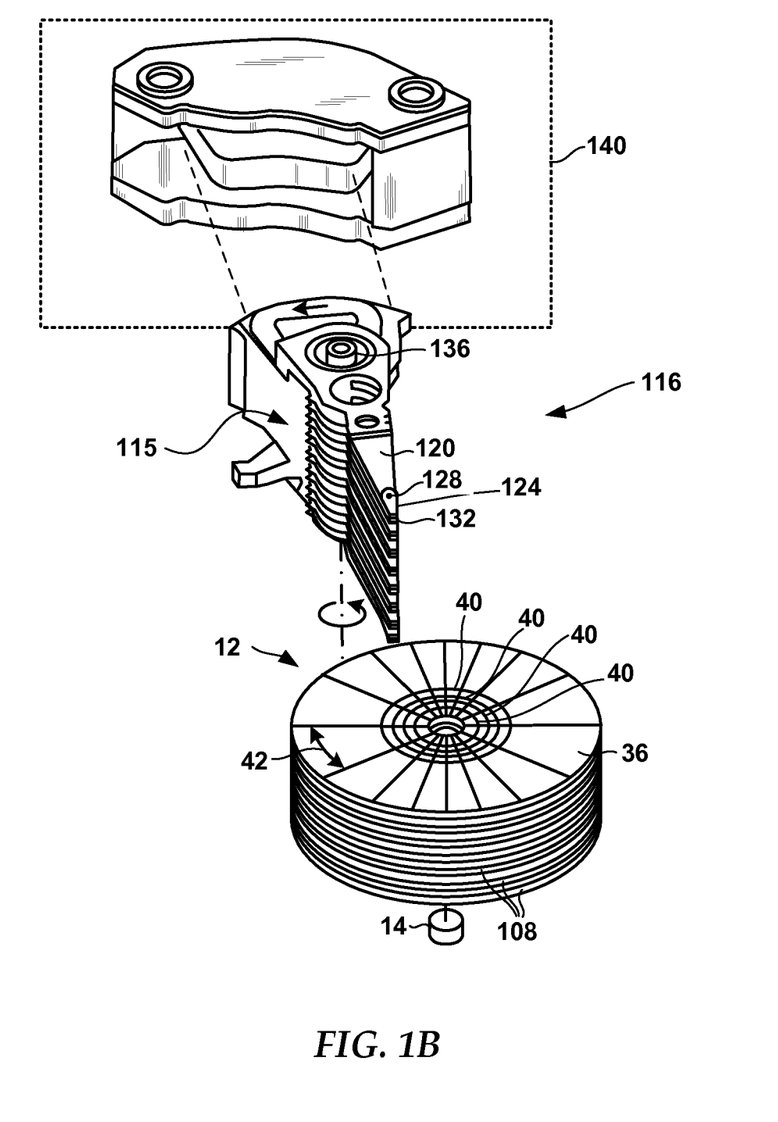
FIG. 1B is an exploded view of portions of the HDD of FIG. 1A.

FIG. 1B is an exploded view further illustrating portions of the disk drive 100 of FIG. 1A. Referring now to FIG. 1B, a disk stack 12 typically includes a plurality of disks 108, each of which may have a pair of disk surfaces 36. The disks 108 are mounted on a cylindrical shaft and are rotated about an axis by the spindle motor 14. Data is stored on the disks 108 within a number of concentric tracks 40 (or cylinders). Each track 40 is divided into a plurality of radially extending sectors 42. Each sector is further divided into a plurality of data sectors defined between adjacent servo spokes. The servo spokes are used to, among other things, accurately position the transducer 132 so that data can be properly written onto and read from a selected track. The data sectors may be used to store and retrieve non-servo related data (i.e., host device data).

Still referring to FIG. 1B, the head stack assembly 115 includes a plurality of actuator arm assemblies 116 each having first and second members 120 and 124, micro actuators 128, and transducers 132. Each transducer 132 is mounted to a corresponding one of the second members 124, and is positioned to be adjacent to a different one of the disk surfaces 36. The coarse actuator 140 and the micro actuators 128 respectively operate to move the first and second members 120 and 124 of the actuator arm assembly 116 to thereby move the transducers 132 across their respective disk surfaces 36. The transducers 132 are configured to fly on an air cushion relative to the data recording surfaces 36 of the rotating disks 108 while writing data to the data recording surface responsive to a write command from a host device or while reading data from the data recording surface to generate a read signal responsive to a read command from the host device.

Figure 2:
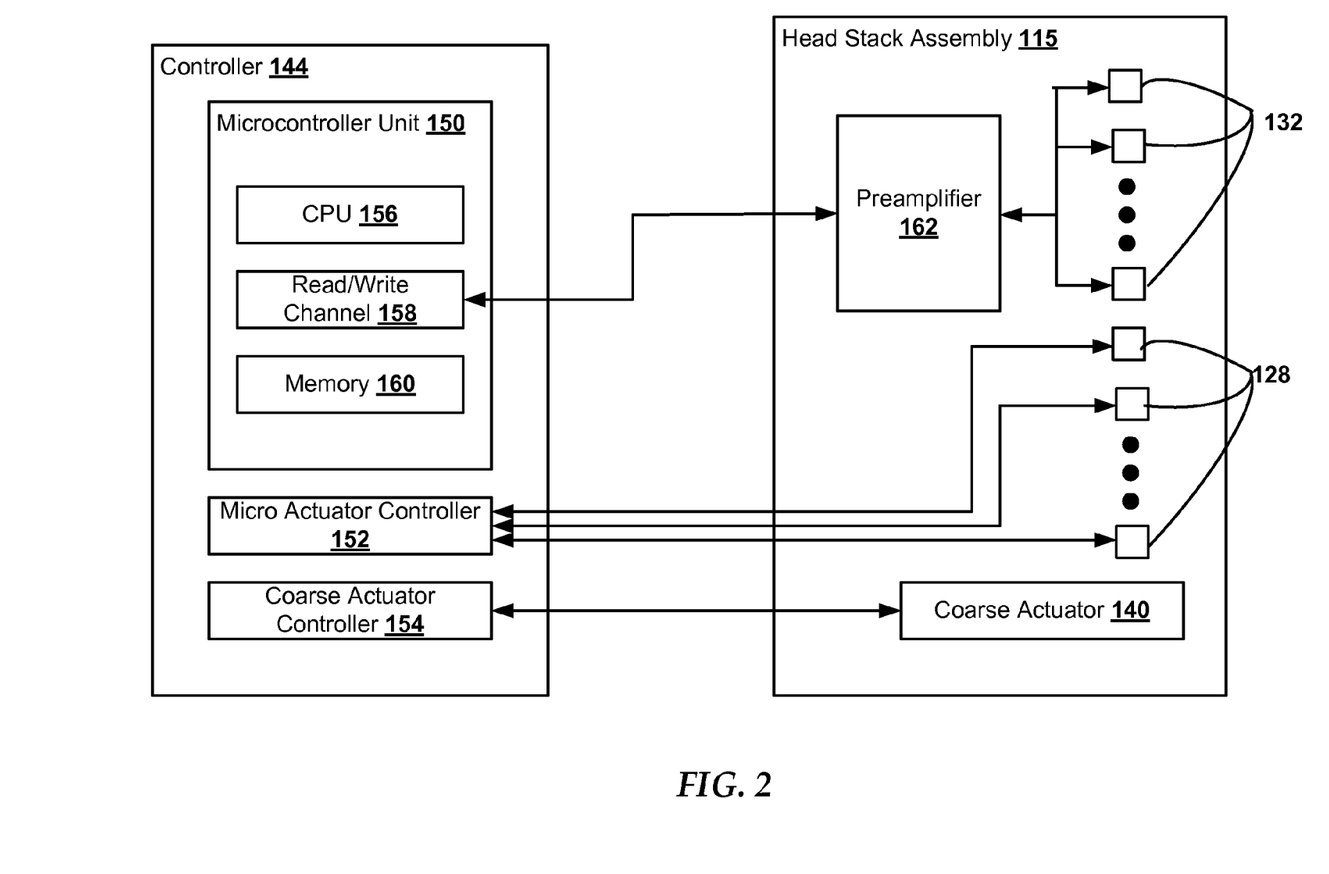
FIG. 2 is a block diagram illustrating the relationship between the controller and head stack assembly of the HDD of FIG. 1A.

The block diagram of FIG. 2 provides a simplified illustration of the relationship between the electronics of the controller 144 and the elements the head stack assembly 115 of HDD 100. The electronics, provided via printed circuit board, present the controller 144 in the form of a microcontroller unit (MCU) 150, a micro actuator controller, e.g., PZT controller, 152, and a coarse actuator controller, e.g., voice coil motor controller, 154. The MCU 150 generally includes a central processing unit (CPU) 156, read/write channel 158, and memory 160 (e.g., cache memory, flash memory, memory for firmware). The controller 144 may include other associated analog and/or digital circuitry as necessary to a specific application. The controller 144 sends control signals to a preamplifier 162, located within the head stack assembly 115, and the preamplifier 162 selects which one of the plurality of transducers 132 to supply with current to enable a read or write operation. The controller 144 additionally sends signals from the micro actuator controller 152 to the micro actuators 128 and from the coarse actuator controller 154 to the coarse actuator 140 to position the selected transducer 132 at a desired location relative its respective disk surface.

Figure 3:
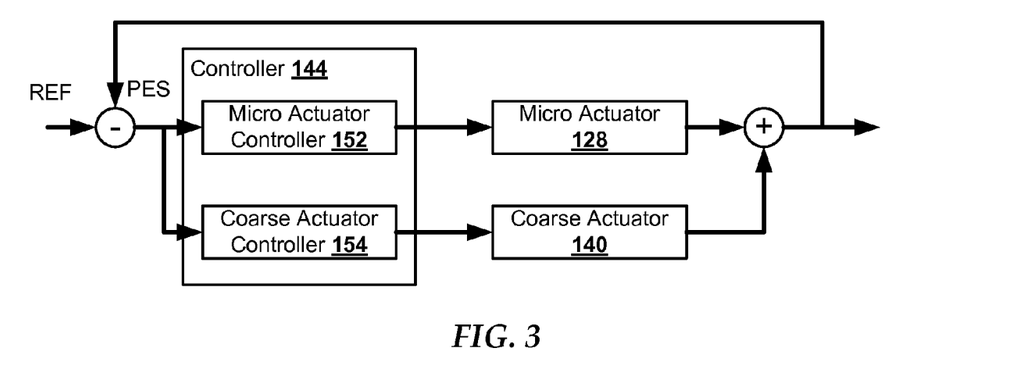
FIG. 3 is a block diagram illustrating the control scheme of the HDD of FIG. 1A.

Movement of the micro and coarse actuators 128 and 140 to radially position the transducer 132 in the HDD 100 is performed in accordance with the basic control scheme of FIG. 3. As illustrated, a position reference signal, REF, indicating a desired position of the transducer 132, is provided to a summing junction. The actual position, POS, of the transducer 132, representing the sum of the micro actuator 128 actual position and the coarse actuator 140 actual position, is also provided at the summing junction. A transducer position error signal, PES, is then generated from the summing junction by subtracting the actual position from the desired position, i.e., REF−POS=PES. The PES signal is provided to the controllers 152 and 154, which in response to the PES, move their respective actuators 128 and 140 to radially reposition the transducer 132 with the goal of achieving the desired location. As such, a continuous closed loop control system utilizing the PES is established to continually correct the actual transducer position to the desired position.

Figure 4A:
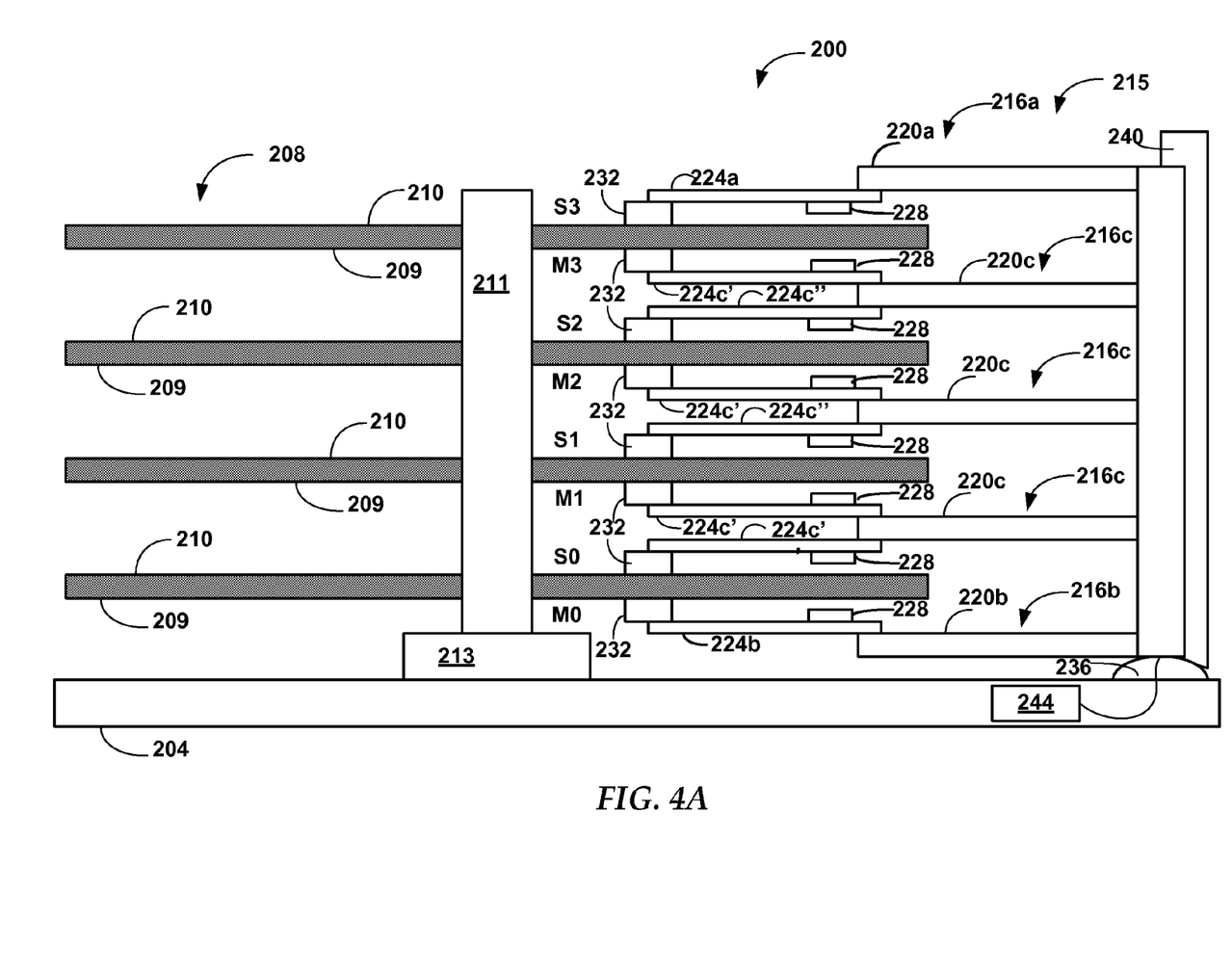
FIG. 4A is elevation view of an HDD according to an example embodiment of the present disclosure.

With an understanding of a HDD 100, HDD 200 embodiments of the present disclosure may be understood with reference to FIGS. 4A-8. Referring to FIG. 4A, HDD 200 includes a base 204 and a plurality of substantially parallel data storage disks 208, for example magnetic storage disks, having data storage tracks defined on both a lower surface 209 and an upper surface 210. The data storage disks 208 are positioned about a spindle 211 and are interconnected to the base 204 by a spindle motor 213 mounted within or beneath a hub (not shown), such that the disks 208 can be rotated relative to the base 204.

HDD 200 is provided with a head stack assembly 215, coupled to a controller 244, which includes a top actuator arm assembly 216a, a bottom actuator arm assembly 216b, and a plurality of intermediate actuator arm assemblies 216c. Each of top and bottom actuator arm assemblies 216a, 216b, includes, respectively, a first member 220a, 220b and a second member 224a, 224b. Each of intermediate arm assemblies 216c include a first member 220c and two second members 224c' and 224c". The first members 220a, 220b and 220c are coupled between base 204 and their respective second members 224a, 224b, 224c' and 224c", and the members 220a, 220b, 220c and 224a, 224b, 224c', 224c" can provide two stages of movement. Interconnecting the respective first members 220a, 220b, 220c and the second members 224a, 224b, 224c', 224c" is a micro actuator 228. A transducer (or read/write head) 232 is mounted on a distal portion of each of the second members 224a, 224b, 224c', 224c" so that it can be positioned adjacent to a storage surface of the disk 208. The transducer 232 may, for example, comprise a magneto resistive (MR) element and/or a thin film inductive (TFI) element.

The first members 220a, 220b, 220c of the actuator arm assemblies 216a, 216b, 216c may be interconnected to the base 204 by a bearing 236. A coarse actuator 240 can pivot the head stack assembly 215 about the bearing 236 to position the micro actuator 228 and, thereby, position the transducer 232 with respect to the disk 208. In particular, the coarse actuator 240 positions the transducer 232 to allow it to access different data tracks on the disk 208. Accordingly, the coarse actuator 240 can position the micro actuator 228 and, thereby, the transducer 232 over a range of movement that may correspond to the distance between an inner and outer data storage track of the storage surface of the disk 208. The coarse actuator 240 may be, for example, a motor, such as a voice coil motor (VCM).

The articulation of the second members 224a, 224b, 224c', 224c" with respect to their respective first members 220a, 220b, 220c of the actuator arm assemblies 216a, 216b, 216c may be achieved, for example, by providing a journal bearing as part of the micro actuator 228. The articulation may also be achieved by providing a flexible interconnection between the respective second members 224a, 224b, 224c', 224c" and first members 220a, 220b, 220c, or by otherwise joining the second members 224a, 224b, 224c', 224c" to their respective first members 220a, 220b, 220c in such a way that the second members 224a, 224b, 224c', 224c" are allowed to move with respect to their respective first members 220a, 220b, 220c.

Figure 4B:
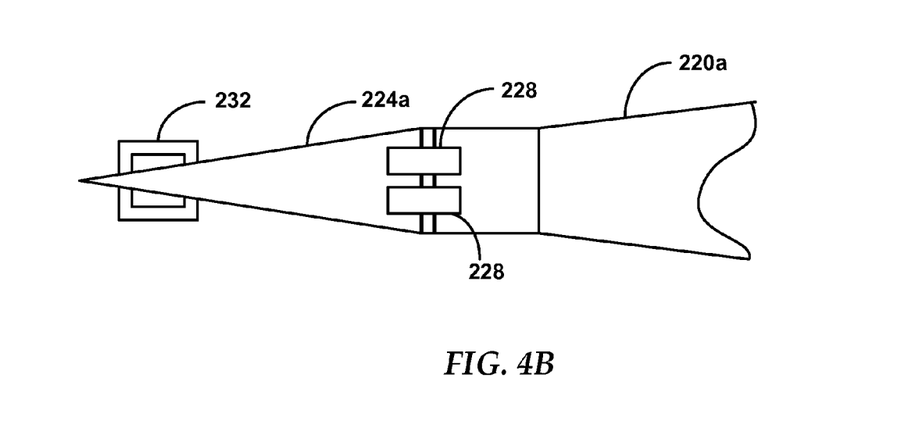
FIG. 4B is an exploded view of portions of the HDD of FIG. 4A.

The micro actuator 228 is configured to position the transducer 232 relative to the disk 208 over a range of movement that is less than the range of movement provided by the coarse actuator 240. As such, the micro actuator 228 may affect finer positioning and/or higher frequency movements of the transducer 232 within its range of movement (e.g., over relatively short distances), such as that which may be encountered during short seeks (e.g., a few tracks) or during track following. Accordingly, the micro actuator 228 may move the transducer 232 faster across the disk 208 within its range of movement, than may be possible with the coarse actuator 240. In some embodiments, the second members 224a, 224b, 224c', 224c" may be eliminated by directly connecting the transducer 232 to a surface or extension of the micro actuator 228. The micro actuator 228 may be any mechanism capable of moving the transducer 232 relative to the disk 208 such as by adjusting the second members 224a, 224b, 224c, 224c" of the actuator arm assemblies 216a, 216b, 216c with respect to their respective first members 220a, 220b, 220c. For example, the micro actuator 228 may be a piezoelectric actuator, an electromagnetic actuator or an electrostatic actuator. FIG. 4B illustrates an example embodiment where the micro actuator 228 comprises a pair of piezoelectric (PZT) actuators.

In the example embodiment of the HDD 200 illustrated in FIG. 4A, each of the second members 224a, 224b, 224c', 224c" along with their associated micro actuators 228 and transducers 232 may be deemed a master head configuration, designated with M0, M1, M2, and M3 or a slave head configuration, designated with S0, S1, S2, and S3. In this embodiment, each of the master head configurations includes micro actuator 228 to position in the x-y plane its associated transducer 232 adjacent the lower surface 209 of data storage disk 208 and each of the slave head configurations includes a paired micro actuator 228 to position in the x-y plane its associated transducer 232 adjacent the upper surface 210 of the same data storage disk 208. Further, in this embodiment, for every master head configuration there is a paired slave head configuration associated therewith. However, it is possible for a master or slave head configuration to exist without an associated counterpart.

Figure 5:
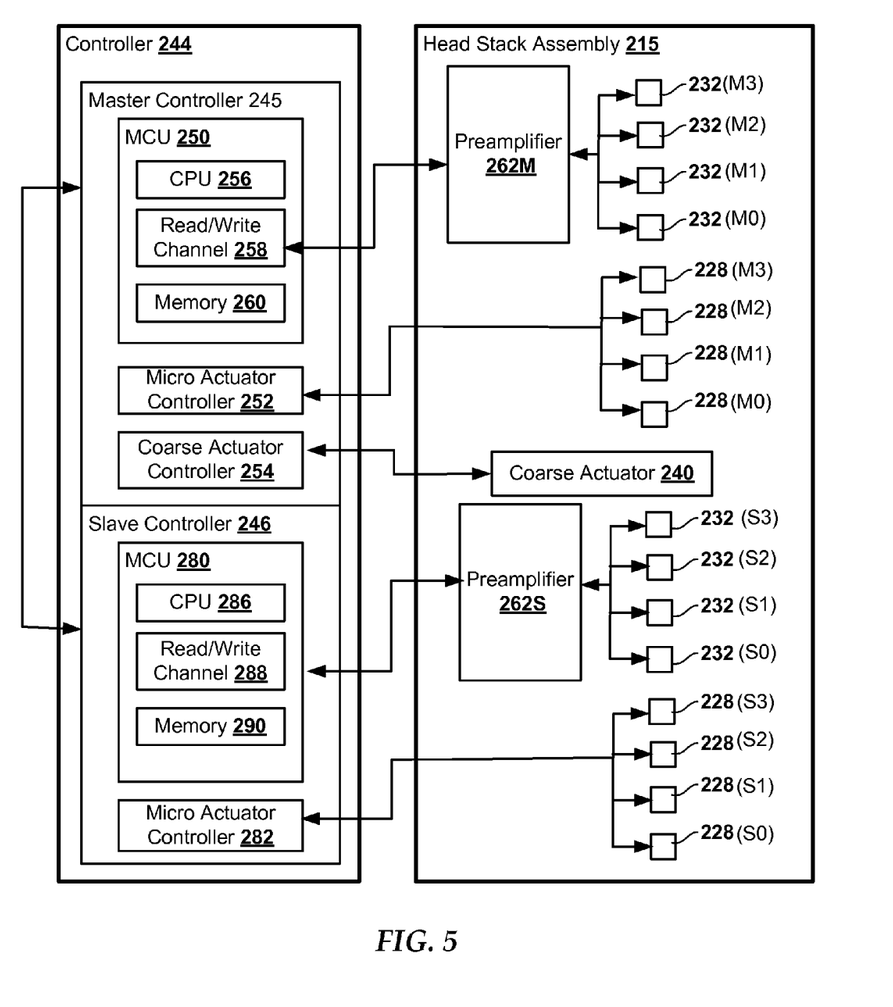
FIG. 5 is a block diagram illustrating the relationship between the controller and head stack assembly of the HDD of FIG. 4A.

The block diagram of FIG. 5 provides a simplified illustration of the relationship between the electronics of the controller 244 and the elements of the head stack assembly 215 according to an embodiment of HDD 200. The electronics, provided via printed circuit board or other appropriate means, present the controller 244 as a master controller 245 and a slave controller 246. The master controller 245 and the slave controller 246 may, for example, comprise two individual controllers, or alternatively, a single controller partitioned to operate as two controllers, or alternatively, a single controller whose logic has been programmed to work in a master/slave mode. Regardless of the controller configuration, communication occurs between the master controller 245 and the slave controller 246 through appropriate communication protocols.

The master controller 245 provides for a microcontroller unit (MCU) 250, a micro actuator controller 252, e.g., PZT controller, and a coarse actuator controller 254, e.g., voice coil motor controller. The MCU 250 generally includes a central processing unit (CPU) 256, a read/write channel 258, and memory 260 (e.g., cache memory, flash memory, memory for firmware, etc.). The slave controller 246 provides for an MCU 280 and a micro actuator controller 282, PZT controller. The MCU 280 generally includes a CPU 286, a read/write channel 288, and memory 290 (e.g., cache memory, flash memory, memory for firmware, etc.). The controller 254, master controller 245 and/or slave controller 246 may include other associated components and/or circuitry, digital or analog, as necessary to a specific application.

The master controller 245 sends control signals to a first preamplifier 262M, located within the head stack assembly 215, and the first preamplifier 262M selects which one of the plurality of master transducers 232 (M0-M3) to supply with current to enable a read or write operation. The master controller 245 additionally sends signals from the micro actuator controller 252 to the relevant master micro actuator 228 (M0-M3) and from the coarse actuator controller 254 to the coarse actuator 240 to position the selected transducer 232 (M0-M3) at a desired location relative the respective lower surface 209 of the data storage disk 208.

Substantially simultaneously, the slave controller 246 receives instructions from the master controller 245 to select the slave transducer 232 (S0-S3) that is paired with the master transducer 232 (M0-M3). The slave controller 246 sends control signals to a second preamplifier 262S, located within the head stack assembly 215, and the second preamplifier 262S accordingly selects which one of the plurality of slave transducers 232 (S0-S3) to supply with current to enable a read or write operation. The slave controller 246 additionally sends signals from the micro actuator controller 282 to the relevant, paired slave micro actuator 228 (S0-S3). The movement of the coarse actuator 240, provided by master controller, in combination with movement of the paired slave micro actuator 228 (S0-S3) positions the slave transducer 232 (S0-S3) at a desired location relative the respective upper surface 210 of the data storage disk 208.

For example, master controller 245 has received an instruction from a host (not shown) to perform a read operation using master transducer 232 (M2). In response a signal is sent from the MCU 250 to first preamplifier 262M to provide current to transducer 232 (M2) to enable a read. Additional signals are sent from master controller 245 to micro actuator controller 252 to position master micro actuator 228 (M2). Substantially simultaneously, a signal is sent from the master controller 245 to the slave controller 246 to send a signal to the second preamplifier 262S to provide current to the corresponding, paired slave transducer 232 (S2) to enable a read operation as well as to send a signal to micro actuator controller 282 to position slave micro actuator 228 (S2). As a result, the coarse actuator controller 254 actuates the arm assemblies, more specifically, intermediate arm assembly 216c, while micro actuator controller 254 actuates master micro actuator 228 (M2) to move second member 224c' and master transducer 232 (M2) in the x-y plane and adjacent the lower surface 209 of data storage disk 208 and micro actuator controller 282 actuates slave micro actuator 228 (S2) to move second member 224c" and slave transducer 232 (S2) in the x-y plane and adjacent the upper surface 210 of data storage disk 208. Thereafter, substantially simultaneous reads are performed by master transducer 232 (M2) and slave transducer 232 (S2) and the read data returned to the respective read/write channels, 258, 288 of the respective controllers 245, 246, e.g., substantially simultaneous servo demodulation is performed on two heads.

Figure 6:
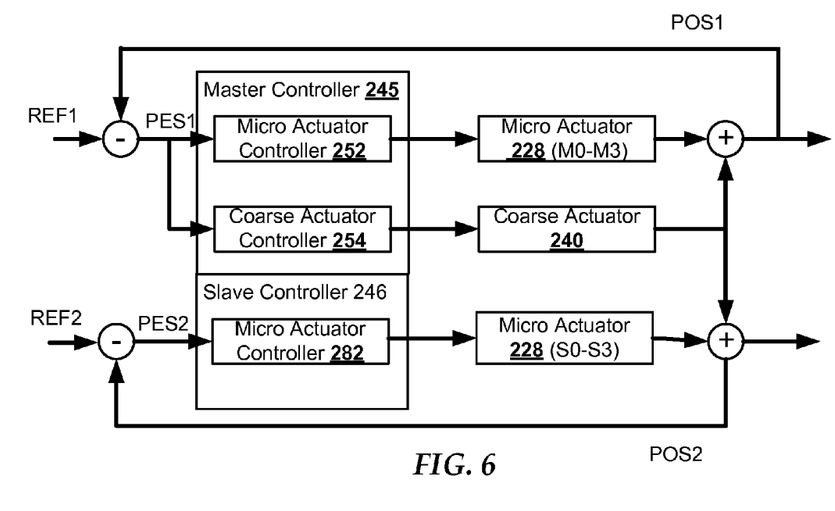
FIG. 6 is a block diagram illustrating an example embodiment of a control scheme of the HDD of FIG. 4A.

Movement of the micro actuators 228 (M0-M3), 228 (S0-S3) and coarse actuator 240 to radially position the transducers 232 (M0-M3), 232 (S0-S3) in an embodiment of HDD 200 is performed in accordance with the basic control scheme of FIG. 6. As illustrated, a position reference signal, REF1, indicating a desired position of the transducers 232 (M0-M3) is provided to a summing junction. The actual position, POS1, of the transducers 232 (M0-M3), representing the sum of the micro actuators 228 (M0-M3) actual position and the coarse actuator 240 actual position is also provided at the summing junction. A transducer position error signal, PES1, is then generated by the summing junction by subtracting the actual position from the desired position, i.e., REF1−POS1=PES1. The PES1 signal is provided to the controllers 252 and 242, which in response to the PES1, move their respective actuators 228 (M0-M3) and 240 to radially reposition to the transducers 232 (M0-M3) with the goal of achieving the desired position. As such, a continuous closed loop control system utilizing PES1 is established to continually correct the actual transducer position of transducers 232 (M0-M3) to the desired position.

Substantially simultaneously, a position reference signal, REF2, indicating a desired position of the transducers 232 (S0-S3) is provided to another summing junction. The actual position, POS2, of the transducers 232 (S0-S3), representing the sum of the micro actuator 228 (S0-S3) actual position and the coarse actuator 240 actual position, is also provided at the summing junction. A transducer position error signal, PES2, is then generated by the summing junction by subtracting the actual position from the desired position, i.e., REF2−POS2=PES2. The PES2 signal is provided only to controller 282, which in response thereto, moves only micro actuators 228 (S0-S3) to radially reposition the transducers 232 (S0-S3) with the goal of achieving the desired position. As such, a continuous closed loop control system utilizes PES2 is established to continually correct the actual transducer position of transducers 232 (S0-S3) to the desired position. Notably, PES 2 is not used to adjust the positioning of coarse actuator 240.

Figure 7:
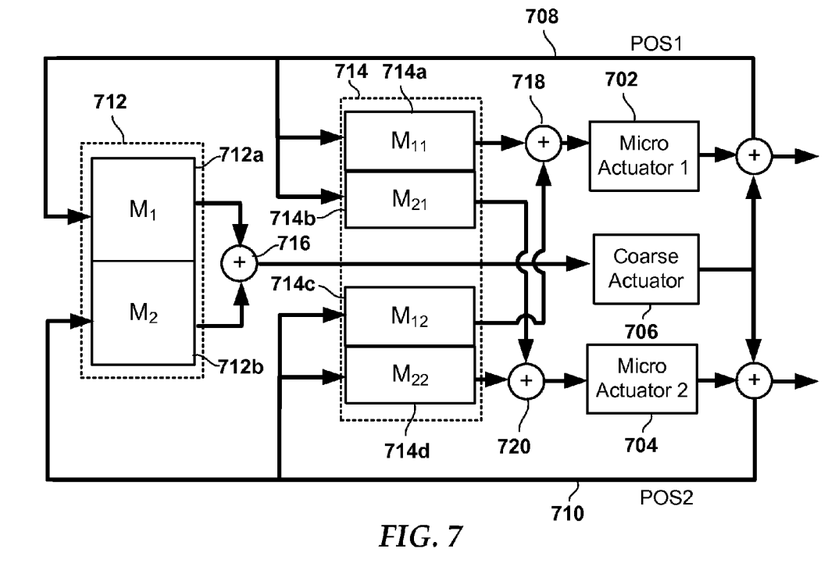
FIG. 7 is a block diagram of a multi-input, multi-output control arrangement according to another example embodiment.

In FIG. 7, a block diagram illustrates a controller arrangement according to another example embodiment. Generally, first and second microactuators 702, 704 (e.g., PZT actuators) provide fine position for respectively positioning two transducers (not shown) that are paired for parallel data streaming of data read from and written to a disk. A coarse actuator 706 (e.g., VCM) moves the transducers together as previously described, e.g., via a head stack assembly upon which read/write heads are commonly mounted. Movements of the microactuators 702, 704 and coarse actuator 706 result in first and second position signals 708, 710 being generated by the transducers, e.g., by reading servo marks from different disk surfaces. The first and second position signals 708, 710 are used as feedback signals by a common-mode control section 712 and a differential mode control section 714. The control sections 712, 714 can be implemented using circuitry previously described (e.g., MCU, preamplifiers, etc.).

The common-mode control section 712 includes a first and second controller 712a-b that respectively receive the first and second position signals 708, 710. These signals may be combined with reference signals before being input to the controllers 712a-b, e.g., to facilitate changing to a desired position, or to maintain an existing position. As such, the signals input to the controllers 712a-b may be considered position error signals. For purposes of clarity, the reference input signals and associated summation blocks are not shown in this figure. The outputs of the first and second controllers 712a-b are combined at a summation block 716 which provides and input signal to the coarse actuator 706. The resulting summation may be scaled, e.g., to form an average of the controller outputs. The common mode control section 712 compensates for, e.g., disturbance that commonly affects all of the transducers that are simultaneously reading different disk surfaces.

The differential-mode control section 714 includes a first and second controller 714a-b that both receive the first position signal 708, and third and fourth controllers 714c-d that receive the second position signal 710. As with the common mode controller 712, the position signals 708, 710 may be combined with reference signals before being input to the controllers 714a-d, although the reference input signals and associated summation blocks are not shown in this figure for clarity. As such, the inputs to the controllers 714a-d may be considered position error signals. Controller 714a provides an output for the first microactuator 702 based on the first position signal 708. Controller 714b provides an output for the second microactuator 704 based on the first position signal 708. Controller 714c provides an output for the first microactuator 702 based on the second position signal 710. Controller 714d provides an output for the second microactuator 704 based on the second position signal 710.

The outputs of the first and third controllers 714a, 714c are combined via summation block 718. The output of the summation block 718 is input to the first microactuator 702. The outputs of the second and fourth controllers 714b, 714d are combined via summation block 720. The output of the summation block 720 is input to the second microactuator 704. The differential mode control section 714 compensates for, e.g., disturbance that individually affects all of the transducers that are simultaneously reading different disk surfaces.

Generally, the control arrangement shown in FIG. 7 operates as a continuous closed loop control system that simultaneously (or substantially simultaneously, as there may be delays in data acquisition and processing) uses both the position signals 708, 710 to control the coarse actuator 706 and the microactuators 702, 704. This is in contrast to the arrangement shown in FIG. 5, wherein only one of the position signals is used to adjust the positioning of the coarse actuator. Further, the differential mode control section 714 independently positions both the first and second microactuators 702, 704 based on a combination of the first position signal 708 and the second position signal 710. The differential mode control section 714 may be configured as a multiple-input, multiple-output (MIMO) control arrangement, and the parameters of the various controllers 714a-d (e.g., gain, transfer functions) can be determined as is known in the art.

Figure 8:
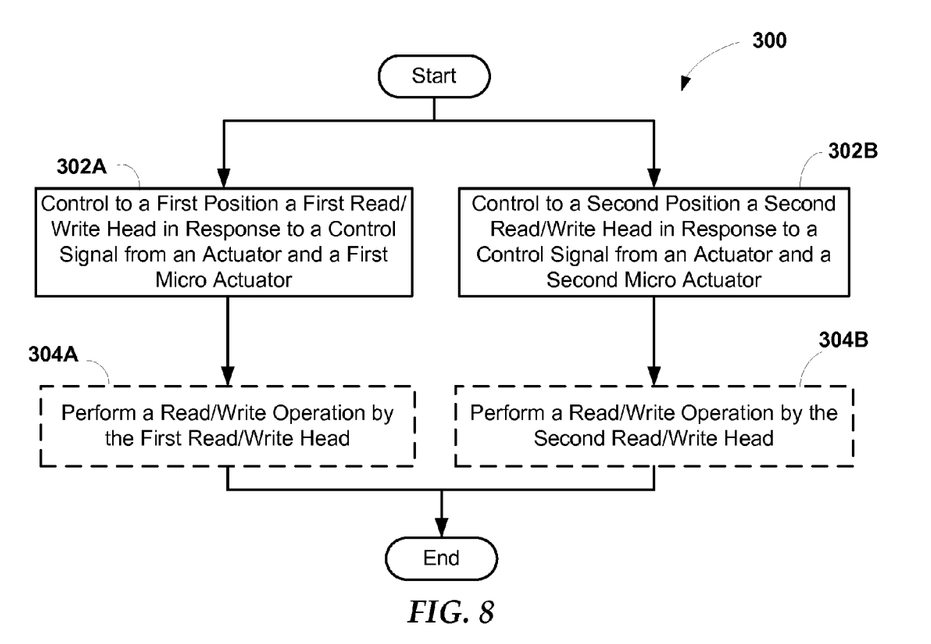
FIGS. 8 and 9 are flowcharts illustrating methods according to example embodiments.

An example embodiment of a method 300 according to the present disclosure is illustrated in FIG. 8. As shown, the method includes substantially simultaneously executing controlling operation 302A and controlling operation 302B to position a first and second read/write head. Specifically, operation 302A includes controlling to a first position the first magnetic read/write head in response to a control signal from an actuator and a first micro actuator. Operation 302B includes controlling to a second position the second magnetic read/write head in response to a control signal from the actuator and a second micro actuator. The control signals may include desired position, actual position, and/or position error signals, which are described in further detail in the paragraphs above. Additionally, the method 300 may optionally include substantially simultaneously performing a read/write operation with first magnetic read/write head, per 304A, and with second magnetic read/write head, per 304B.

Figure 9:
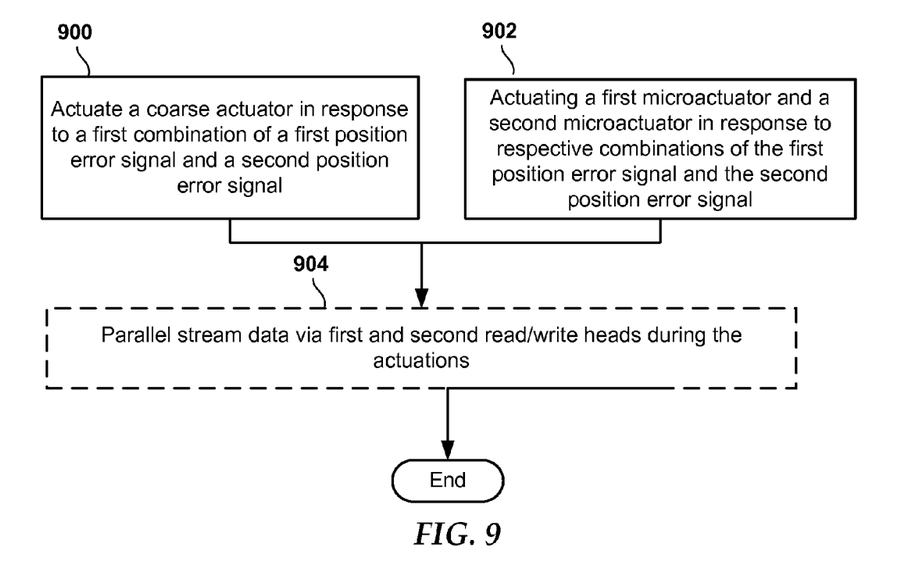

In FIG. 9, a flowchart shows another example of a method according to an example embodiment. The method involves actuating 900 a coarse actuator in response to a first combination of a first position error signal and a second position error signal. A first microactuator and a second microactuator are actuated 902 in response to respective second and third combinations of the first position error signal and the second position error signal. The first microactuator may be coupled between a first read/write head and the coarse actuator, and the second microactuator may be coupled between a second read/write head and the coarse actuator, the first position error signal originating from the first read/write head and the second position error signal originating from the second read/write head. All actuations 900, 902 may occur simultaneously. The method may optionally involve parallel streaming 904 of data via the first and second read/write heads during the actuations.

In one embodiment, the first and second microactuators may be actuated via a multiple-input, multiple-output controller. The multiple-input, multiple-output controller that independently positions both the first and second microactuators based on both the first position error signal and the second position error signal. The method and its variations described above may be implemented on an apparatus having controller circuitry configured and arranged to perform the operations described above.

The various embodiments of the hard disk drive (HDD) 200 may be especially useful during the manufacturing and testing of new disk drives. The simultaneous operation of multiple heads to provide simultaneous data streams can reduce disk drive manufacturing time through parallelism. Certain disk drive manufacturing steps are especially costly in terms of time. An example of a time-intensive manufacturing step includes coherent run-out characterization (CHROME) wherein the servo positioning of all or many tracks on a surface are characterized for coherent repeatable run-out. This characterization is then parameterized and stored non-volatilely for mitigation. Another example includes adaptive fly-height adjustment wherein the recording head is positioned at various radii across the disk and the power-to-contact is measured. The measured power is later used to adjust the fly-height of the head, for example, by adjusting the applied heater power to the recording head during read and write operations.

Another example of a time-intensive disk drive manufacturing step includes the thermal asperity (TA) scan wherein the recording head scans all tracks in the drive for thermal asperities; detected thermal asperities are then avoided when laying out user sectors. Repeatable run-out (RRO) cancellation is still another example wherein all (or most) tracks in the drive are scanned for repeatable run-out. The RRO data is then stored non-volatilely, for example, by writing data to a field within each servo wedge on every track, and used for compensation when reading and writing. Defect scan, format and security scan are also time-intensive disk drive manufacturing steps. The defect scan comprises a test pattern(s) being written to the media and then read-back to locate any defects on the disk; defective sectors are not used for storing data. Format includes writing a pattern to all sectors containing user data (optionally, the sectors are read back to confirm the data were stored properly). Security format is similar to format but with encryption enabled; the sectors are written with encryption turned on typically after a drive has been personalized for its final customer.

The ability of HDD 200 to simultaneously servo-track on parallel surfaces, see for example, FIG. 4A and parallel surfaces 209 and 210, using two recording heads (e.g., M0 and S0), can reduce the time needed to execute the disk drive manufacturing tasks noted above, and perhaps others, by roughly half. The control scheme of FIG. 6 enhances manufacturing test time reduction by providing a second servo-controller, e.g. micro actuator controller 282, for positioning of the secondary head, e.g., S0. Long seeks and coarse positioning for the primary head, e.g., master head M0, and the secondary head, slave head S0, can be performed with the servo control system, e.g., coarse actuator controller 254, of the coarse actuator 240 while the separate micro actuator servo systems, e.g., micro actuator controller 252 and micro actuator controller 282, can adjust the micro actuators, e.g., micro actuators 228 (M0-M3) and 228 (S0-S3), for independent track following. If appropriate, the piezo elements of the micro actuators may be altered to increase the stroke required to simultaneously servo-track on parallel surfaces. Further, as noted earlier, a communication link between servo controllers, e.g., between master and slave, may be used to communicate position information and feed forward position control updates to compensate for position control disturbances of the heads.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus, comprising:
   a first read/write head coupled to a first micro actuator and an actuator;
   a second read/write head coupled to a second micro actuator and the actuator; and
   a controller configured to position the first read/write head in response to both a first micro actuator control signal and an actuator control signal, and configured to position the second read/write head in response to both a second micro actuator control signal and the actuator control signal,
   wherein the positioning of the first read/write head and the second read/write head are performed simultaneously,
   wherein an actual position of the first read/write head is compared to a desired position of the first read/write head to produce a first position error signal, and wherein the controller is configured to actuate both the first micro actuator and the actuator in response to the first position error signal,
   wherein an actual position of the second read/write head is compared to a desired position of the second read/write head to produce a second position error signal, and wherein the controller is configured to actuate only the second micro actuator in response to the second position error signal.

2. The apparatus of claim 1, wherein the controller is additionally configured to initiate performance of a read/write operation by both the first and second read/write heads at substantially the same time.

3. The apparatus of claim 1, wherein the first read/write head and the second read/write head are directionally opposite.

4. The apparatus of claim 1, wherein an actual position of the first micro actuator and an actual position of the actuator are combined to represent the actual position of the first read/write head, and wherein an actual position of the second micro actuator and the actual position of the actuator are combined to represent the actual position of the second read/write head.

5. An apparatus, comprising:
   a first read/write head coupled to a first micro actuator and an actuator;
   a second read/write head coupled to a second micro actuator and the actuator; and
   a controller configured to position the first/read write head through actuation of the first micro actuator and the actuator in response to a first position error signal, wherein the controller is configured to position the second read/write head through actuation of only the second micro actuator in response to a second position error signal, and wherein the controller is configured to position the first and second read/write heads simultaneously.

6. The apparatus of claim 5, wherein the controller is additionally configured to initiate performance of a read/write operation by both the first and second read/write heads at substantially the same time.

7. The apparatus of claim 5, wherein the first read/write head and the second read/write head are directionally opposite.

8. The apparatus of claim 5, wherein the first position error signal is representative of a difference between a desired position and an actual position of the first read/write head.

9. The apparatus of claim 8, wherein the second position error signal is representative of a difference between a desired position and an actual position of the second read/write head.

10. A method comprising:
    actuating both a first microactuator and an actuator in response to a first position error signal; and
    actuating only a second microactuator in response to a second position error signal.

11. The method of claim 10, wherein the first microactuator is coupled between a first read/write head and the actuator, and wherein the second microactuator is coupled between a second read/write head and the actuator.

12. The method of claim 11, wherein all actuations occur simultaneously.

13. The method of claim 11, further comprising:
    determining the first position error signal by comparing an actual position of the first read/write head with a desired position of the first read/write head; and
    determining the second position error signal by comparing an actual position of the second read/write head with a desired position of the second read/write head.

14. An apparatus comprising:
    controller circuitry configured and arranged to:
    receive first and second position error signals;
    generate a coarse actuator position signal and a first microactuator position signal in response to the first position error signal; and
    generate a second microactuator position signal in response to only the second position error signal.

15. The apparatus of claim 14, wherein the controller circuitry is further configured and arranged to:
- actuate the coarse actuator in response to the coarse actuator position signal;
- actuate the first microactuator in response to the first microactuator position signal; and
- actuate only the second microactuator in response to the second microactuator position signal.

16. The apparatus of claim 14, wherein the controller circuitry is configured and arranged to perform the actuations simultaneously.

17. The apparatus of claim 14, further comprising:
- a first read/write head mechanically coupled to the first microactuator; and
- a second read/write head mechanically coupled to the second microactuator.

18. The apparatus of claim 17, further comprising:
a magnetic recording disc positioned between the first and second read/write heads.

19. The apparatus of claim 15, wherein the coarse actuator is a voice coil motor.

20. The apparatus of claim 15, wherein the first and second microactuators are piezoelectric actuators.

21. A method comprising:
- actuating a coarse actuator in response to a first combination of a first position error signal and a second position error signal; and
- actuating a first microactuator and a second microactuator in response to respective second and third combinations of the first position error signal and the second position error signal.

22. The method of claim 21, wherein the first microactuator is coupled between a first read/write head and the coarse actuator, and wherein the second microactuator is coupled between a second read/write head and the coarse actuator, the first position error signal originating from the first read/write head and the second position error signal originating from the second read/write head.

23. The method of claim 21, wherein all actuations occur simultaneously.

24. The method of claim 21, further comprising:
- determining the first position error signal by comparing an actual position of the first read/write head with a desired position of the first read/write head; and
- determining the second position error signal by comparing an actual position of the second read/write head with a desired position of the second read/write head.

25. The method of claim 21, wherein the first and second microactuators are actuated via a multiple-input, multiple-output controller that independently positions both the first and second microactuators based on both the first position error signal and the second position error signal.

26. The method of claim 21, further comprising parallel streaming of data via the first and second read/write heads during the actuations.

27. An apparatus comprising controller circuitry configured and arranged to perform the method of claim 21.

* * * * *